United States Patent Office 2,900,297

Patented Aug. 18, 1959

2,900,297

FUNGICIDAL COMPOSITION AND METHOD FOR ITS PREPARATION

James C. Wygant, Dayton, Ohio, assignor to Monsanto Chemical Company, St. Louis, Mo., a corporation of Delaware No Drawing. Application March 4, 1957
Serial No. 643,540

4 Claims. (Cl. 167—30)

This invention relates to chlorinated organic compounds and more particularly provides a phenyl-substituted highly chlorinated bicycloheptene as a new compound, the method of preparing the same, and fungicidal compositions comprising the new compound.

According to the invention there is provided 1,2,3,4,6,7,7-heptachloro-5-phenylbicyclo[2,2,1]-2-heptene by the reaction of hexachlorocyclopentadiene with 2-phenylethylenesulfonyl chloride substantially according to the scheme:

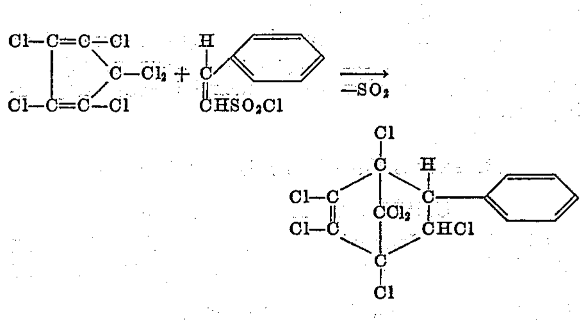

As noted above, reaction of hexachlorocyclopentadiene with the 2-phenylethylene sulfonyl chloride takes place with evolution of sulfur dioxide.

Preparartion of the 1,2,3,4,6,7,7-heptachloro-5-phenylbicyclo[2,2,1]-2-heptene according to the present process takes place readily by simply heating a mixture of the hexachlorocyclopentadiene with 2-phenylethylenesulfonyl chloride in the presence or absence of an inert diluent or solvent. Inasmuch as molecular equivalents of the diene and the sulfonyl chloride are involved in the formation of the present chlorinated phenyl-bicyclo-heptene, stoichiometric proportions of these reactants are used; however, it may be advantageous to employ an excess of the hexachlorocyclopentadiene as a diluent. Although an extraneous diluent or solvent is often useful, the reaction may be effected in the absence of such solovent or diluent, especially if vigorous agitation be employed or an excess of the diene be used. High boiling diluents are preferred; for, advantageously, heating is conducted at a temperature of, say, from 150° C. to 300° C. Refluxing temperatures of the reaction mixture are conveniently employed. When operating with large quantities it is desirable to arrange for easy escape of the evolved sulfur dioxide during the heating.

1,2,3,4,6,7,7-heptachloro - 5 - phenbicyclo[2,2,1] - 2-heptene is a high boiling, stable compound which is advantageously used for a variety of industrial and agricultural purposes, e.g., as a plasticizer for synthetic resins and plastics and as a lubricant additive. As will be shown hereinafter it is particularly valuable as an agricultural fungicide.

The invention is further illustrated, but not limited, by the following examples:

*Example 1*

A mixture consisting of 10 g. (0.0492 mole) of 2-phenylethylenesulfonyl chloride and 136 g. (0.498 mole) of hexachlorocyclopentadiene was heated to reflux (230° C.) and refluxing was continued for three hours, at the end of which time the refluxing temperature of the reaction mixture was 238° C. During the refluxing, evolution of sulfur dioxide was noted. After stripping off unreacted hexachlorocyclopentadiene at 14 mm. Hg pressure, there was obtained as residue a black oil which was dissolved in hexane. The resulting solution was treated with charcoal and filtered. Evaporation of the filtrate under reduced pressure to remove the hexane gave an uncrystallizable residue. This was dissolved in hexane and the resulting solution submitted to distillation, first at atmospheric pressure for removal of the hexane and then at reduced pressure to give (A) a fraction B.P. 95–190° C./2.7–2.9 mm. (pot temperature, 147–201° C.), and (B) a fraction B.P. 190–218° C./2.9 mm. (pot temperature, 201–240° C.). (A) was essentially hexachlorocyclopentadiene. Fraction (B), subtially pure 1,2,3,4,6,7,7-heptachloro - 5 - phenylbicyclo-[2,2,1]-2-heptene, analyzed as follows:

| | Found | Calcd. for $C_{13}H_7Cl$ |
|---|---|---|
| Percent C | 37.45 | 37.95 |
| Percent H | 1.75 | 1.72 |
| Percent Cl | 60.05 | 60.33 |
| Percent S | 0.04 | 0.00 |

*Example 2*

This example shows testing of 1,2,3,4,6,7,7-heptachloro-5-phenylbicyclo[2,2,1]-2-heptene against wheat rust.

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The test compound (100 mg.) was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with water to give an emulsion containing 0.5% by weight of the 1,2,3,4,6,7,7-heptachloro-5-phenylbicyclo [2,2,1]-2-heptene.

Spraying of the plants with the 0.5% emulsion was effected by means of an atomizer, 10 ml. of the emulsion being used per plant respectively. The sprayed plants were then returned to the greenhouse and held there for a week. Observation of the plants at the end of that time disclosed that the plants which had been sprayed with said 0.5% emulsion were sustantially free of rust pustules. Similarly inoculated but unsprayed plants which had been maintained in the incubator and greenhouse for the same length of time were found to be badly affected by the rust.

*Example 3*

This example shows testing of 1,2,3,4,6,7,7-heptachloro-5-phenylbicyclo[2,2,1]-2-heptene against the fungus *Monilinia fructicola*. A suspension of the fungus was prepared from a 5-day old culture thereof on an agar slant culture by removing said spores with a rubber policeman from the slant and suspending them in distilled water. The concentration of spores was adjusted to about 40,000 per ml. of water.

A 1.0% acetone solution of the test compound i.e., the 1,2,3,4,6,7,7-heptachloro-5-phenylbicyclo[2,2,1]-2-heptene of Example 1, was added to water in a concentration calculated to give 1,000 parts of the test compound per million parts of water. An 0.02 ml. aliquot of the resulting solution was pipetted, respectively, into two wells of a depressed glass side and allowed to evaporate to dryness. Then a 0.1 ml. aliquot of the above spore suspension was respectively pipetted into each well. The concentration in each well was thus lowered to 200 parts per million parts of diluent. Two "controls" were also prepared by pipetting respectively 0.1 ml. aliquots of the above spore suspensions in two empty wells of a depressed glass slide. The slides were then incubated in a moist chamber for 16 hours at 25° C. Inspection of the slides at the end or this time showed no germination of the *Monilinia fructicola* in the presence of the test compound, i.e., on the slides on which the 1,2,3,4,6,7,7-heptachloro-5-phenylbicyclo[2,2,1]-2-heptene had been deposited, whereas there was profuse germination on the "controls."

1,2,3,4,6,7,7-heptachloro-5-phenylbicyclo[2,2,1]-2-heptene retards fungus growth on plants, fruits, seeds, soils, furs, leather, cotton, wood and organic material in general. It may be applied directly to the organic material which is to be treated, but because it is effective in extremely dilute concentrations, it is preferred to incorporate it with a carrier or a diluent. Solutions of the compound may be employed in the absence of any dispersant; however, for many purposes the addition of a dispersing agent is preferred in that better adhesion or penetration of the treating solution is obtained. As dispersing agents there may be used, e.g., alkali metal salts of higher alkyl sulfosuccinates, the higher alkylbenzenesulfonates, polyalkylene glycol ethers of long chained alcohols, etc.

Fungistatic dusts may be prepared by mixing the present salts with dusting materials such as talc, clay, lime, bentonite, pumic, fuller's earth, etc.

Compositions comprising the present compound may be applied only to the surface of the material to be protected against fungi as when treating foliage, furs, leather and other comparatively impregnable material upon which fungus growth is to be prevented or retarded. In other cases, for example, when it is desired to protect seeds from soil microorganisms harmful to the seeds and plants, the present compound preferably incorporated with a solid carrier, may be mixed with the seed. Impregnation of textiles is advantageously effected by immersion in a solution of the compound in the presence or absence of a wetting-out agent.

What I claim is:

1. 1,2,3,4,6,7,7-heptachloro-5-phenylbicyclo[2,2,1]-2-heptene.

2. The method which comprises heating hexachlorocyclopentadiene with 2-phenylethylenesulfonyl chloride and recovering 1,2,3,4,6,7,7-heptachloro-5-phenylbicyclo[2,2,1]-2-heptene from the resulting reaction product.

3. A composition effective against fungi which composition comprises an inert carrier and 1,2,3,4,6,7,7-heptachloro-5-phenylbicyclo[2,2,1]-2-heptene as the essential effective ingredient.

4. The method of preventing fungus growth which comprises exposing the fungus to a toxic quantity of 1,2,3,4,6,7,7-heptachloro-5-phenylbicyclo[2,2,1]-2-heptene.

References Cited in the file of this patent

UNITED STATES PATENTS

| | | |
|---|---|---|
| 2,606,910 | Herzfeld et al. | Aug. 12, 1952 |
| 2,657,168 | Buntin | Oct. 27, 1953 |

FOREIGN PATENTS

| | | |
|---|---|---|
| 1,112,467 | France | Nov. 16, 1955 |